(12) United States Patent
White et al.

(10) Patent No.: US 8,499,664 B2
(45) Date of Patent: Aug. 6, 2013

(54) AXLE SHAFT COVER PLATE WITH BEARING ASSEMBLY

(75) Inventors: David M. White, Decatur, IL (US); Christopher G. Oakley, Decatur, IL (US); Keith A. Kabrick, Springfield, IL (US)

(73) Assignee: Caterpillar Inc., Peoria, IL (US)

( * ) Notice: Subject to any disclaimer, the term of this patent is extended or adjusted under 35 U.S.C. 154(b) by 874 days.

(21) Appl. No.: 12/567,153

(22) Filed: Sep. 25, 2009

(65) Prior Publication Data

US 2011/0075960 A1    Mar. 31, 2011

(51) Int. Cl.
F16C 35/06    (2006.01)
F16H 57/02    (2012.01)

(52) U.S. Cl.
USPC .............. 74/607; 180/371; 384/606; 384/620

(58) Field of Classification Search
USPC ................ 74/606 R, 607; 384/462, 474, 517, 384/518, 589, 544, 609, 611, 620, 459, 188; 301/105.1, 108.4, 108.5, 111.01, 111.03
See application file for complete search history.

(56) References Cited

U.S. PATENT DOCUMENTS

| | | | | |
|---|---|---|---|---|
| 1,676,894 A * | 7/1928 | Frank | ............................. | 384/474 |
| 1,705,281 A * | 3/1929 | Bott | ............................. | 384/518 |
| 2,195,795 A | 4/1940 | Baker | | |
| 2,593,919 A * | 4/1952 | Reynolds | ....................... | 384/459 |
| 2,802,542 A * | 8/1957 | Gerst | ............................. | 180/371 |
| 3,716,280 A | 2/1973 | Leibensperger et al. | | |
| 3,890,015 A | 6/1975 | Harbottle | | |
| 4,166,659 A | 9/1979 | Gleichman | | |
| 4,363,608 A | 12/1982 | Mulders | | |
| 5,114,248 A | 5/1992 | Harsdorff | | |
| 5,190,355 A * | 3/1993 | Hobbie et al. | ............. | 301/105.1 |
| 5,328,275 A * | 7/1994 | Winn et al. | ..................... | 384/472 |
| 5,520,468 A | 5/1996 | Iguchi | | |
| 6,112,411 A * | 9/2000 | Rutter | ......................... | 29/898.07 |
| 6,149,244 A | 11/2000 | Wagner | | |
| 2004/0089495 A1 | 5/2004 | Strain | | |
| 2006/0029314 A1 | 2/2006 | Pete et al. | | |
| 2007/0219040 A1 | 9/2007 | Garcia et al. | | |

FOREIGN PATENT DOCUMENTS

| | | |
|---|---|---|
| JP | 05185852 | 7/1993 |
| JP | 08085358 | 4/1996 |
| JP | 2003226103 | 8/2003 |
| KR | 100665304 | 1/2007 |
| WO | 2007049882 | 5/2007 |

* cited by examiner

*Primary Examiner* — Thomas Diaz

(74) *Attorney, Agent, or Firm* — Michael D. Braunstein; Leydig, Voit & Mayer

(57) ABSTRACT

A cover plate for a drive assembly that includes a bearing housing having a bearing cavity, a thrust bearing axially disposed within the bearing cavity that includes a cup, cone and plurality of rollers disposed between cup and cone raceways, a thrust plate with an axle engaging surface disposed perpendicular to a central axis and coupled for rotation to the cone. The cover plate may be connected to a final drive housing of a final drive that includes a plurality of gears operatively connected to an axle shaft, the end of the axle shaft positioned to rotationally engage the thrust plate and cone.

17 Claims, 7 Drawing Sheets

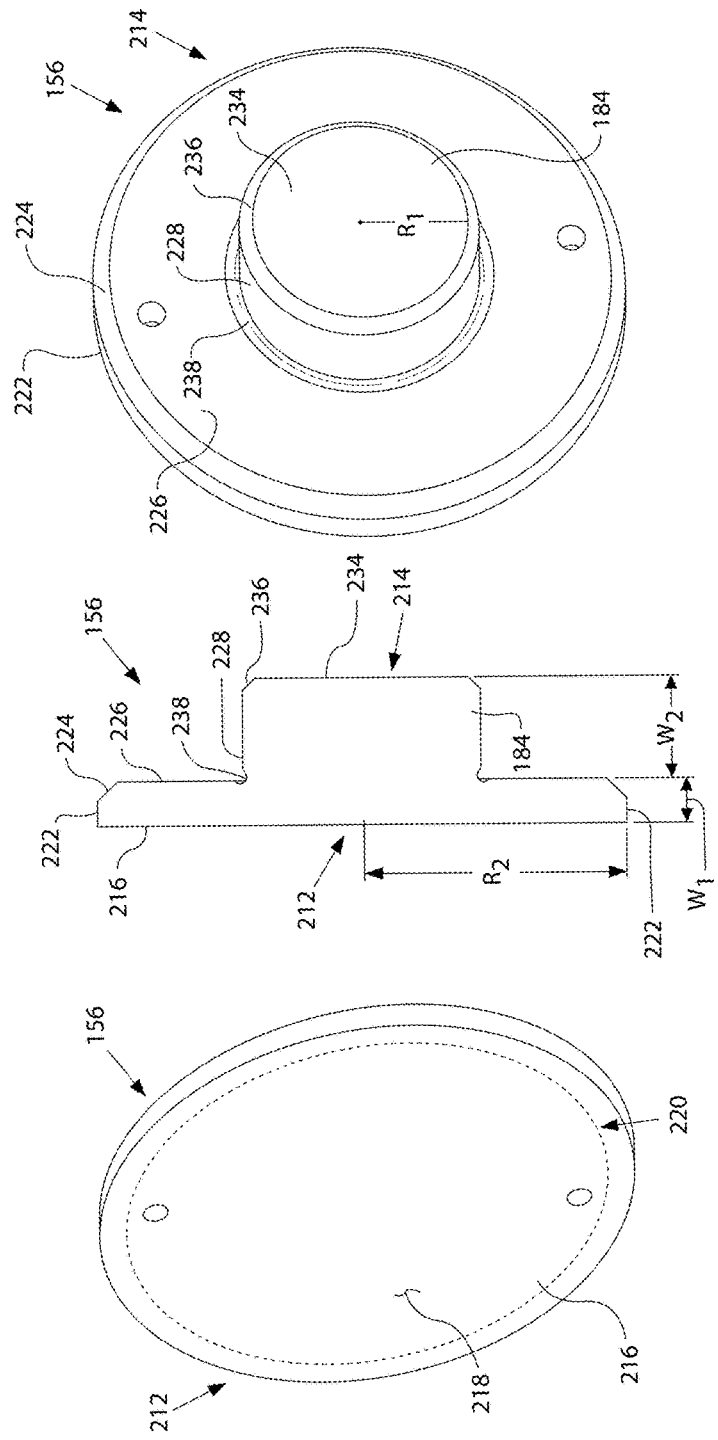

AXLE SHAFT COVER PLATE WITH BEARING ASSEMBLY

TECHNICAL FIELD

The present disclosure relates generally to axle and final drive assemblies for heavy machinery, and more particularly to an axle assembly including a cover plate having a bearing assembly for engagement of an end of an axle shaft.

BACKGROUND

A conventional power train for vehicles, particularly for heavy industrial machinery such as that used in forestry, landfill operations, agriculture, mining, construction, material handling, tunneling, drilling and other industries, often includes a power source that is operatively connected to the driven traction devices, such as the rear wheels of a wheeled machine, through an axle shaft connected to a final drive assembly. The final drive assembly typically consists of a gear set that is designed to alter the rotational speed and torque transmitted from the axle shaft to the traction devices of the machine. Examples of machines employing such arrangements may include, for example, loaders, motor graders, dozers, excavators, compactors, water trucks, articulated trucks, dump trucks, tractors, material handlers, and similar heavy mobile equipment.

For example, in an off-highway truck or tractor, such as an off-highway dump truck, an engine or other power source may be operatively connected through a transmission to a rear differential that is configured to transmit rotational power to the rear wheels disposed on opposing sides of the machine. The two axle shafts extending from the rear differential may be connected through a sun gear to the final drive including planetary gears, carriers, pins, and additional sun gears, as is well known in the art. Such final drives are configured to provide a reduction in rotational velocity with an accompanying increase in torque delivered to the driven rear wheels of the machine. The final drive typically includes a final drive housing having an external cover plate that can be removed for access to the axle shaft and final drive components. In some configurations, the cover plate may also serve to restrict axial movement of the associated axle shaft during operation. However, this can lead to distortion and wear of both the axle shaft and the cover plate. To resolve this issue, it is known to include a replaceable wear plate that is affixed to the internal surface of the cover plate. The axle shaft is disposed against the wear plate during operation, the axle shaft rotating at a higher velocity than the cover plate and affixed wear plate due to the reductive final drive.

To decrease the time associated with maintenance and replacement of the centrally disposed axle shaft, it is also known to provide a cover plate that includes an outer cover plate and an inner, smaller cover plate, wherein the smaller cover plate may be removed without having to fully drain lubricant from the final drive housing to access and/or remove the axle shaft. A wear plate has been attached to an inner surface of the inner cover plate to engage the axle shaft. In this regard, removing the smaller cover plate also provides a more efficient method for replacement of the wear plate.

While the wear plate can reduce the stresses to the axle shaft and reduce wear to both the axle shaft and an unprotected cover plate, the axle shaft can still be subject to wear, distortional stresses and the associated decreased performance and/or axle failure. The present disclosure is directed to an improved cover plate, thrust plate and bearing assembly that addresses one or more of the problems or shortcomings set forth above.

SUMMARY OF THE INVENTION

In one aspect, the present disclosure provides a drive assembly for a mobile machine that includes an axle shaft having an outer end and a central axis, and a final drive having a plurality of gears operatively connected to the axle shaft contained within the final drive housing. Connected to the final drive housing is a cover plate assembly that includes a bearing housing, thrust bearing and thrust plate. The bearing housing includes a first end, a second end, and an axially aligned bearing cavity, the bearing cavity defined by an interior housing surface that extends between an opening at the second end of the bearing housing and an interior end wall. The thrust bearing is axially disposed within the bearing cavity, and includes a cup with a cup raceway, a cone with a cone raceway positioned opposing the cup raceway, and a plurality of rollers positioned between the cup and cone raceways. The thrust plate includes an axle engaging surface disposed perpendicular to the central axis, and is rotationally coupled to the cone. The outer end of the axle shaft is positioned to rotationally engage the axle engaging surface so that the axle, thrust plate and cone rotate as a single unit.

In another aspect, provided is a cover plate for a drive assembly, the cover plate generally including a bearing housing, a thrust bearing and a thrust plate. The bearing housing includes a bearing cavity with a longitudinal central axis, the bearing cavity defined by an interior housing surface extending between an open end of the bearing housing and an interior end wall. The thrust bearing is axially disposed within the bearing cavity and includes a cup with a cup raceway, a cone with a cone raceway opposing the cup raceway, and a plurality of rollers positioned within the raceways. The thrust plate includes an axle engaging surface disposed perpendicular to the central axis and is coupled for rotation to the cone.

In yet another embodiment, a cover plate for a final drive is disclosed, the cover plate having a first end and a longitudinal central axis, the first end including a cover portion having a circumferential retaining flange disposed transverse to the axis. The cover plate also includes a bearing housing having an axially aligned bearing cavity, the bearing cavity defined by an interior housing surface that extends between an open end of the bearing housing and an interior end wall. A thrust bearing is disposed within the bearing housing, the thrust bearing including a cup with a cup raceway, a cone having a cone raceway positioned opposing the cup raceway, and a plurality of rollers positioned between the cup and cone raceways. A thrust plate having an axle engaging surface disposed perpendicular to the central axis is provided with a cylindrical extension opposite the axle engaging surface, the cylindrical extension disposed within a bore of the cone for rotational coupling therewith.

These and other aspects and advantages of the present disclosure will become apparent to those skilled in the art upon reading the following detailed description in connection with the drawings and appended claims.

BRIEF DESCRIPTION OF THE DRAWINGS

FIG. 7A is a perspective view of a first end of a thrust plate in accordance with one embodiment of the present disclosure;

FIG. 7B is a side view, in cross section, of the thrust plate of FIG. 7A;

FIG. 7c is a perspective view of a second end of the thrust plate of FIG. 7A.

DETAILED DESCRIPTION

Figure 1:
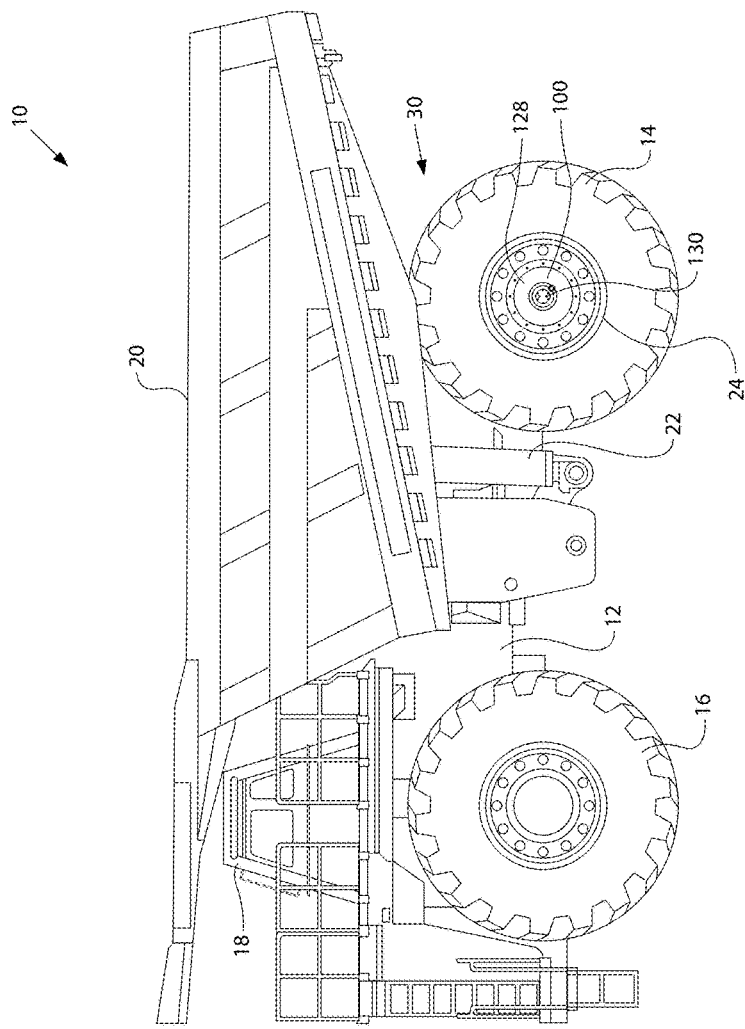
FIG. 1 is a side view of a mobile machine in accordance with one embodiment of the present disclosure.

An exemplary embodiment of a mobile machine 10 is shown generally in FIG. 1. The machine may be an off-highway truck, as shown, or any other on or off-highway machine that includes a propulsion system with an axle assembly. Other exemplary machines 10 may include, for example, wheel loaders, motor graders, wheeled or tracked dozers, wheeled or tracked excavators, water trucks, articulated trucks and similar heavy mobile equipment. Referring to FIG. 1, the exemplary off-highway truck includes a frame 12 that supports a power source (not shown) operatively coupled for propulsion to rear wheels 14. Front wheels 16 may or may not be driven and are operable for front-wheel steering. The frame 12 also supports an operator station 18 that includes the many operator controls, displays and other components necessary for primary control of the machine during ordinary operations (not shown). For an off-highway dump truck, the machine 10 may also include a truck body 20 for hauling material, which may be tilted relative to the frame via hydraulic actuators 22 connected between the frame 12 and body 20.

The power source of the mobile machine 10 may include an engine, such as, for example, a diesel engine, a gasoline engine, a gaseous fuel powered engine such as a natural gas engine, or any other type of engine apparent to one skilled in the art. The power source may alternatively include a non-combustion source of power such as a fuel cell, power storage device, electric motor, or similar mechanism. The power train of the machine 10 may include the power source operatively coupled through, for example, a transmission (not shown) that is mechanically connected through an output shaft to a rear differential as is well known in the art. In an alternative embodiment, the machine 10 may include an electric drive propulsion system (not shown) that includes an alternator, generator, or other component configured to convert mechanical energy from the power source into electrical energy that is transferred to one or more electric drive motors for machine propulsion. Both mechanical and electrical type power trains are well known in the art.

Figure 2:
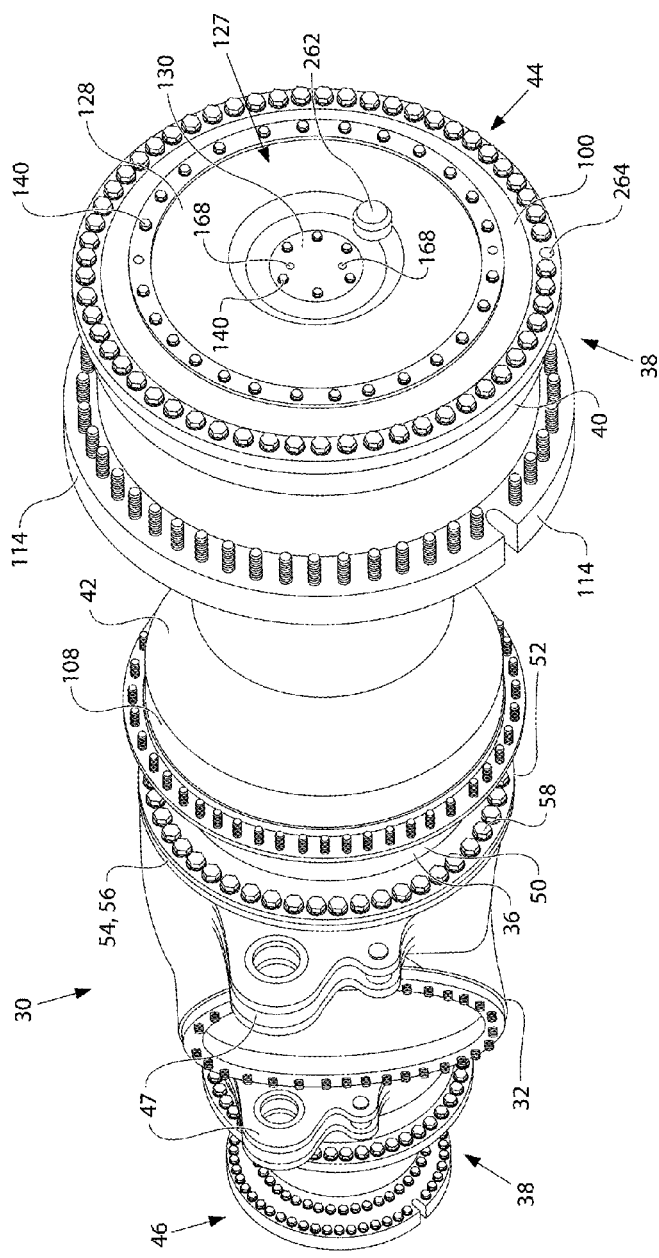
FIG. 2 is a perspective view of a rear drive assembly of the machine of FIG. 1.
Figure 3:
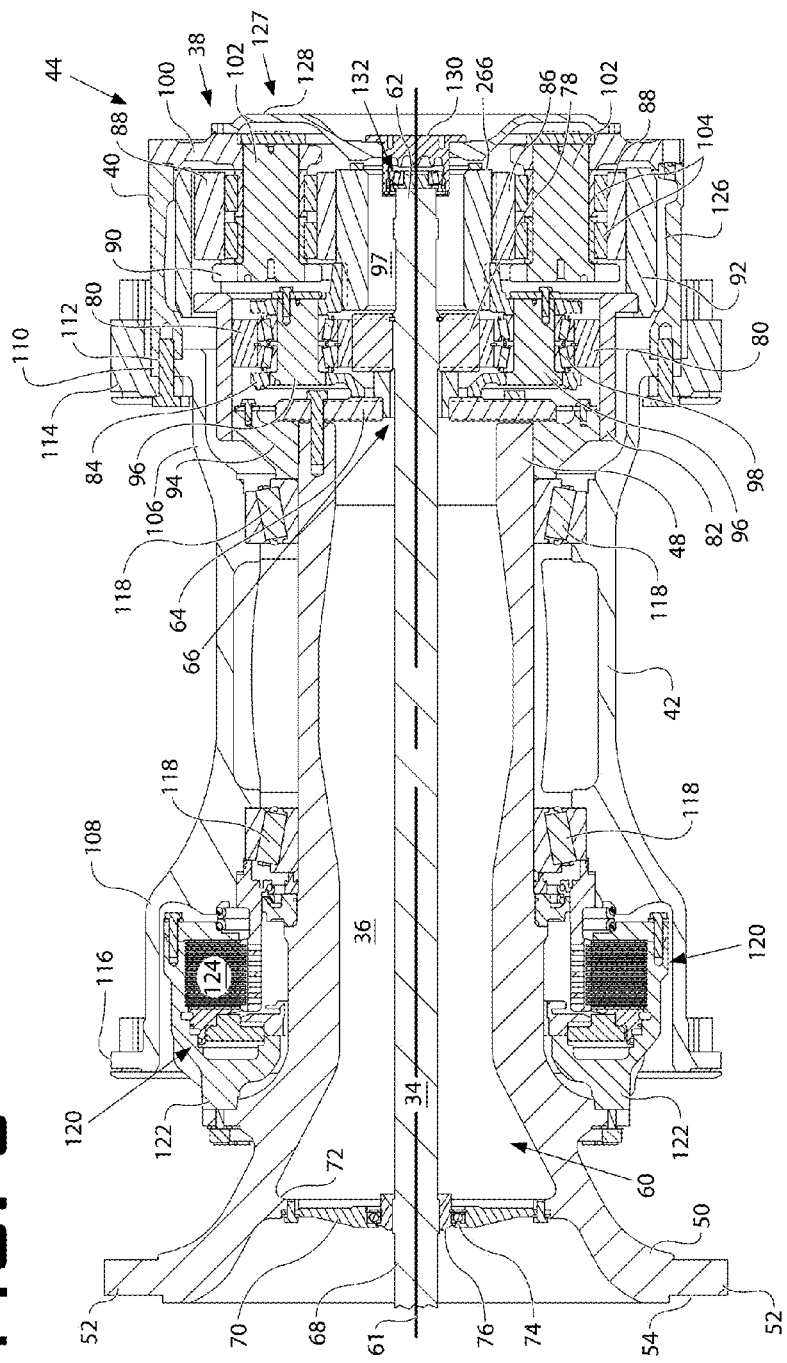
FIG. 3 is a side view, in cross section, of one side of the rear drive assembly of FIG. 2.

The rear wheels 14 of machine 10 may be supported for rotation and operatively connected to the power train through a drive assembly 30 such as that shown in greater detail in FIGS. 2-3. The drive assembly 30 generally includes a differential housing 32, axle shaft 34, spindle 36, final drive 38 including final drive housing 40, and wheel assembly 42. The differential housing 32 may enclose a differential (not shown) including one or more gears that transfer driving force from an input shaft to the right and left axle shafts 34. The differential gears also may allow the left and right axle shafts 34 to have different rotational velocities for improved machine control during turning as is well known in the art. Again, various differential configurations and components are well known in the art and will not be described further herein. As should also be apparent from FIG. 2, the rear drive assembly 30 includes opposing first and second sides 44,46, each side generally including a spindle 36, final drive 38, final drive housing 40, and wheel assembly 42. Only those components for the first side shall be discussed in detail herein, the first and second sides 44,46 being substantially identical. Moreover, although a differential housing 32 is shown, one of skill in the art should readily appreciate that the differential housing 32 may be replaced by a housing for one or more electric motors in the case of an electric drive configuration (not shown). It should also be appreciated, that, for example, in an electric drive configuration, that the first and second sides, may be independent of one another, i.e., the opposing sides may not be connected through a common central housing.

The differential housing 32 generally includes one or more mounts 47 for connection of the rear drive assembly 30 to the machine frame 12, typically through pivotal connections that may include one or more linkages or suspension cylinders (not shown) that allow a degree of movement of rear drive assembly 30 relative to the frame 12. This may also allow for vertical movement of the first side 44 of the rear drive assembly 30 relative to the second side 46.

Connected to the differential housing 32 is spindle 36. The spindle 36 includes a first (distal) end 48 adjacent final drive 38, and a second (proximal) end 50 that is connected to the differential housing 32. The second end 50 includes an annular spindle flange 52, the flange 52 having an end surface 54 for engaging mating annular surface 56 of the differential housing 32. Circumferentially spaced fasteners (bolts) 58 connect the spindle 36 to the differential housing 32 through the spindle flange 52.

The spindle 36 provides protection and support for the axle shaft 34, FIG. 3, that is aligned within spindle axle cavity 60 along rotational axis 61. The axle shaft 34 is supported for rotation at a first end 62 by a retainer plate 64 having an axially positioned spherical roller thrust bearing 66, and is supported for rotation at a second end 68 by a spindle housing member 70 that has an external portion mounted to an internal flange 72 of the spindle 36, and an axially disposed ball bearing assembly 74 that includes an axle shaft guide 76.

Disposed at the first end 62 of the axle shaft 34 is a reductive final drive 38 that generally includes a first reduction sun gear 78 splined to axle shaft 34, first reduction planetary gears 80, first reduction ring gear 82, first reduction planetary carrier 84, second reduction sun gear 86, second reduction planetary gears 88, second reduction planetary carrier 90, and second reduction ring gear 92. The first reduction ring gear 82 is restricted from movement and connected to the spindle 36 via reaction hub 94. First reduction sun gear 78 is rotationally coupled to the axle shaft 34 and engages four radially disposed planetary gears 80. The planetary gears 80 include a central bore and bearing 98 for receiving first carrier pins 96 fixedly connected to first reduction carrier 84 for rotation of the carrier 84 about central axis 61. Extending outward from the first reduction carrier 84 is the second reduction sun gear 86, the interior of the second reduction sun gear 86 defining an axle end cavity 97. The second sun gear 86 is configured to drivingly engage second reduction planetary gears 88 that are drivingly connected to end wall 100 of the final drive housing 40 via secondary planetary pins 102, the pins 102 being supported for rotation relative to the second reduction planetary gears 88 via pin bearings (cylindrical roller bearings) 104. Other final drive arrangements are well known in the art.

Coaxially disposed in surrounding relationship to the spindle 36 and axle shaft 34 is wheel assembly 42, the wheel assembly 42 primarily serving as a connection between the final drive housing 40 and the wheel hub(s) 24, FIG. 1. More specifically, the wheel assembly 42 has first end 106 and second end 108, the first end 106 having a circumferential flange 110 configured for bolted engagement with final drive mating surface 112. The bolted connection also includes a rim adapter 114 having circumferential segmented components that provide the bolted attachment to an external wheel hub 24. At the second (proximal) end 108 of the wheel assembly 42 is a hub flange 116 for a second (internal) hub and tire (not shown). Thus, in one embodiment, each of the sides 44,46 of the drive assembly 30 supports two driven tires.

The wheel assembly 42 may be supported on the spindle 36 for rotation by one or more wheel assembly bearings, such as tapered roller bearings 118. In one embodiment, the drive assembly 30 may also include a brake assembly 120 that generally includes a brake housing 122 with a plurality of brake disks 124 that may be selectively engaged by, for example, operator controls to control braking of the machine 10 by, for example, restricting relative movement between the spindle 36 and wheel assembly 42, as is well known in the art.

Referring again FIGS. 2-3, the final drive 38 encloses the gears, carriers, pins and other components within a final drive cavity 126 defined, in part, by the first end of the wheel assembly 106, the final drive housing 40, the final drive end wall 100, and a cover plate assembly 127 including outer 128 and inner 130 cover plates. Generally, the cover plates 128, 130 protect the final drive components, seal the final drive cavity 126, and provide access to the final drive components and axle shaft 34 for assembly and service. In particular, the inner cover plate 130 provides for access to the axle shaft 34 without having to drain lubricant from the final drive 38. The inner cover plate 130 also includes an axle end bearing assembly 132 that absorbs axial thrust and provides rotational engagement of the axle shaft 34. The outer cover plate 128, inner cover plate 130 and associated axle end bearing assembly 132 are illustrated in greater detail in FIGS. 4-6.

The inner cover plate 130 includes a first, distal end 134 that includes a retaining portion 136 that engages and provides a seal against outer cover plate 128. In one embodiment, the retaining portion 136 may include a circumferential retaining flange 138 that includes a plurality of circumferentially spaced fasteners, bolts 140 with washers 142 (six shown). However, other retaining member designs, such as a plurality of circumferentially spaced tabs (not shown) may be employed. An inner surface 144 of the retaining portion 136 is configured to engage a mating surface 146 of the outer cover plate 128, the outer cover plate 128 also having a plurality of threaded bores 148 for receiving fasteners 140. A resilient sealing member 150, such as an o-ring, may be disposed between the inner surface 144 and mating surface 146, and may, for example, be disposed within an annular groove 151 of the inner surface 144 as shown. In the alternative, a similar groove may be provided in connection with mating surface 146, or in both surfaces 144,146.

The inner cover plate 130 also includes an axle end bearing assembly 132 that generally consists of cover plate bearing housing 152, bearing 154, thrust plate 156, retainer 158 and biasing member(s) 160. The cover plate bearing housing 152 may be configured to be received within an axial opening 162 of the larger, outer cover plate 128, the opening 162 defined by a central wall portion 164 of the outer cover plate 128. In one embodiment, the cover plate bearing housing 152 is generally cylindrical, having a first end 165, second end 167, and cylindrical outer surface 166, the cover plate bearing housing 152 being received within a corresponding circular opening 162 of the outer cover plate 128. Alternative configurations for the opening and outer surface may be employed, however, the circular configuration allows the bearing housing 152 to be inserted and then rotated for aligning the threaded bores 148 and fasteners 140. In this regard, threaded positioning bores 168 may be provided, FIG. 2, for rotating and/or pulling the inner cover plate 130, or for use in supporting the weight of the cover plate 130 in connection with an overhead lifting device.

In yet another embodiment, the outer and inner cover plates 128, 130 may be configured, for example, cast or welded, as a single component. However, in that case, the unitary cover plate would have to be removed in its entirety to access the bearing assembly 132, axle shaft 34 and final drive cavity 126, making the internal components more difficult, costly and time consuming to service.

Bearing assembly 132, including bearing 154 and thrust plate 156, is designed to frictionally engage and axially retain the rotating axle shaft 34, while allowing the axle shaft 34 to rotate at a significantly higher speed than the cover plates 128, 130 as a result of the reductive final drive 38. In one embodiment, the bearing 154 is a spherical roller thrust bearing generally including a cone 170, bearing cage 172, rollers 174, and bearing cup 176. "Spherical" roller bearings, as known in the art, are tapered bearings that include a longitudinal curvature to the outer surface that provides advantages over conventional tapered bearings with respect to misalignment. The cone 170 includes a first end 178 having an end surface 180, and a cone bore 182 configured to receive thrust plate extension 184. In one embodiment, the cone bore 182 is defined by a cylindrical inner surface 185. The cone 170 also includes a second end 186 that includes the cone raceway 188, an inwardly sloped roller engaging surface relative to axis 61. The cup 176 includes a cylindrical outer surface 192 and an inner sloped roller engaging surface, cup raceway 194. The tapered rollers 174 are positioned within annular outer cage element 190 between the cone and cup raceways, 188, 194.

While other types of bearings may be employed, the spherical roller bearing shown is configured to engage the axle shaft 34, a rotating element that transmits torque from the differential side gears (not shown) to the final drive sun gear 78, along with axial thrust loads as indicated at F. The spherical roller bearing has, in addition to its axial capacity, the ability to withstand radial loads and operate under angular misalignment of the axle shaft 34 relative to the bearing 154. One such bearing is available as part 29412E from the SKF Group of Gottenburg, Sweden.

However, those of skill in the art should appreciate that other types of bearings, for example, roller bearings, cylindrical roller bearings and taper bearings may be employed. Ball bearings and cylindrical roller bearings are primarily radial bearings with limited axial force allowances. In order to obtain the necessary axial capacity for certain applications, these bearings may require dimensions not suitable for use. These bearings may also be less tolerant to misalignment, resulting in undesired wear, premature failure, and increased maintenance and downtime. Tapered bearings are also primarily a radial bearing, but have a higher allowance for axial forces. However, such bearings may not operate in a misaligned condition, rather such bearings will prevent or try to correct for misalignment. And, restricting the axle shaft's degree of freedom of movement may contribute to higher forces being transmitted to other components of the drive assembly.

Figure 5:
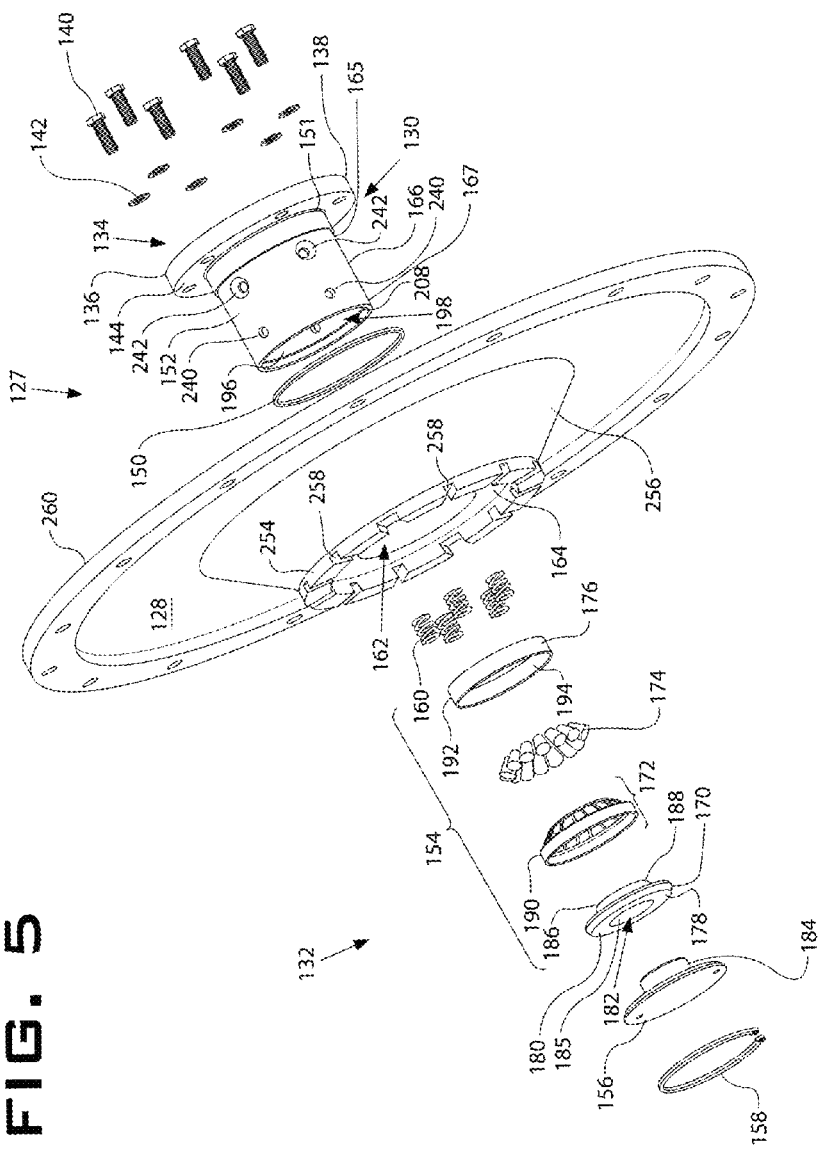
FIG. 5 is an exploded view of the cover plate and bearing assembly of FIG. 4.
Figure 6:
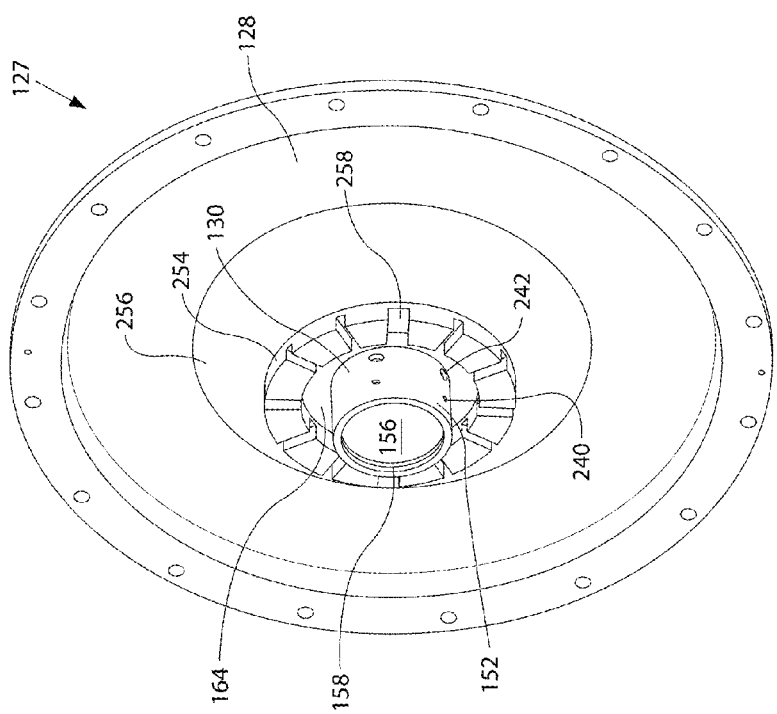
FIG. 6 is a perspective view of the interior side of a final drive cover plate in accordance with one embodiment of the disclosure.

The bearing housing 152 includes an inner surface 196 defining a bearing cavity 198 configured to slidingly receive the bearing 154 and thrust plate 156. In one embodiment, at least a first portion 200 of the inner surface 196 substantially conforms to the outer cup surface 192, the radial gap between inner surface 196 and the cup outer surface 192 being, for example, 0.015 mm. The bearing housing 152 also includes an interior end wall 202 that includes one or more cavities 204 configured for receiving biasing members (compression springs) 160. A plurality of such cavities 204 may be disposed in spaced arrangement parallel to axis 61, for example, as shown in FIG. 5, five biasing members 160 may be employed and positioned to engage an end surface 206 of cup 176. The springs 160 bias the bearing 154 and associated thrust plate 156 inward against the axle shaft 34 and retainer 158. Retainer 158 may, for example, be a circlip that is disposed within a retainer groove 208 on a second, outer portion 210 of the inner surface 196 of the bearing housing 152.

Figure 4:
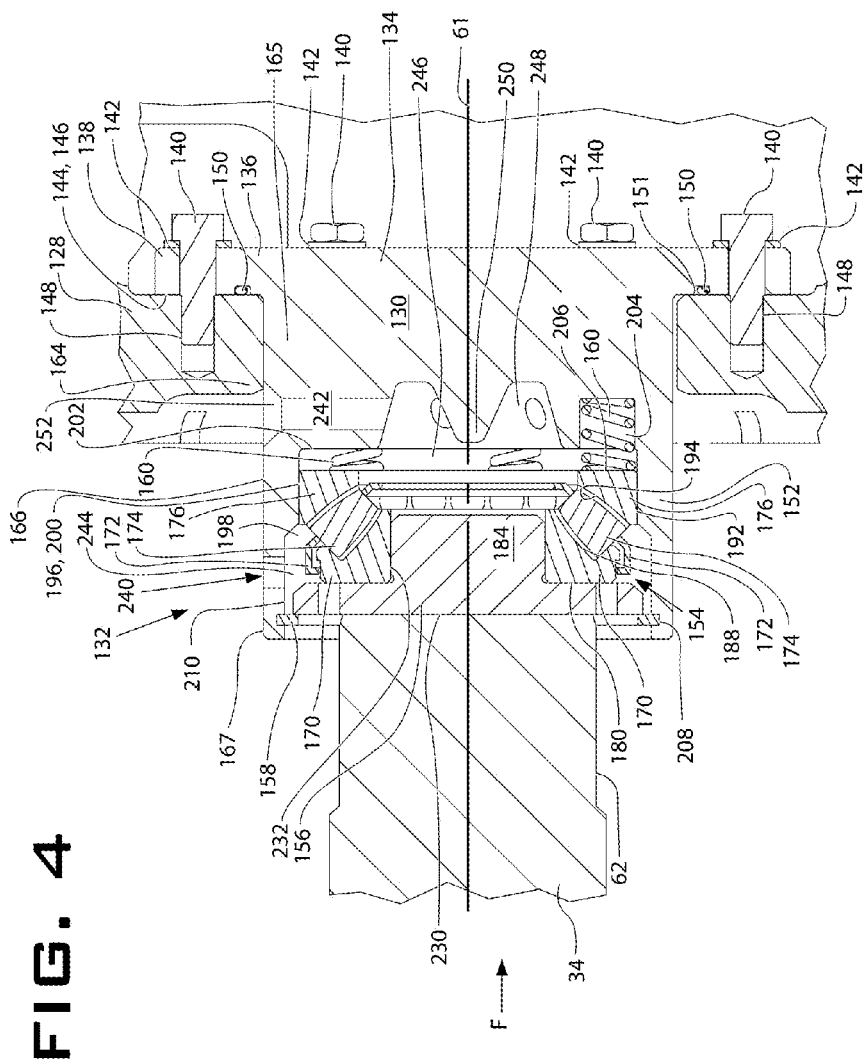
FIG. 4 is a side view, in cross section, of a cover plate and bearing assembly in accordance with one embodiment of the disclosure.

The thrust plate 156 is depicted in greater detail in FIGS. 7A-7C. The thrust plate 156 includes a first end 212 and second end 214, the first end 212 configured to engage a first end 62 of axle shaft 34, while the opposing second end 214 is configured to engage bearing 154. More specifically, the first end 212 includes an end surface 216 that includes a central axle engaging surface 218 configured to frictionally engage an end surface 230 of axle shaft 34 (FIG. 4). As shown, therefore, axle engaging surface 218 is substantially planar and disposed perpendicular to axis 61. The axle engaging surface 218 may have a larger diameter than that of the axle end surface 230 to allow for misalignment of the axle shaft 34 relative to the thrust plate 156. The thrust plate 156 may also include a circumferential retainer portion 220 configured to engage retainer 158. In one embodiment, for example, the radius, $R_2$, of the end surface 216 may be 67 mm, where the axle shaft has a radius of approximately 48 mm. Other specific dimensions will vary based on the application as should be appreciated by one of skill in the art.

The first end 212 of the thrust plate 156 may include an outer cylindrical surface 222 with a first inwardly tapered portion 224, the tapered portion 224 provided to enhance response to misalignment by providing more clearance between outer cylindrical surface 222 and inner surface 196. The width $W_1$ of the outer cylindrical surface 222 with the tapered portion 224 may be, for example, at least 5 mm, more particularly 11 mm for a bronze thrust plate. As with the other dimensions described herein, the dimension $W_1$ may vary depending on the specific application, however, in this instance, the thickness should be sufficient to withstand the axial forces exerted by the outward spring bias against the retainer 158 without deformity and to allow a degree of wear to the axle engagement surface 218 dependent on a number of parameters, such as, for example, the rotational velocities, anticipated axial forces, material hardness, and desired component life.

The second end 214 of the thrust plate 156 is configured to engage bearing 154. First, the second end 214 may include a bearing engaging portion or surface 226 disposed perpendicular to the axis 61 of the bearing 154, opposing axle engaging surface 218. Second end 214 also includes a bearing engaging extension 184 configured for positioning within cone bore 182, an outer surface 228 of the extension 184 being in press fit engagement with an inner surface 232 of the cone 170 (FIG. 4). The extension may be cylindrical, with the outer surface 228 terminating at an extension end surface 234. A second tapered portion 236 may be provided at the edge of outer surface 228 and end surface 234 to facilitate insertion of the extension 184 within cone bore 182. A circumferential groove 238 may be provided at the junction between extension surface 228 and bearing engagement surface 226 such that forces between the bearing 154 and thrust plate 156 are applied to surfaces 228, 226. The radius $R_1$ of the extension may be, for example, about 30 mm, and the width, $W_2$, may be about 25 mm. In one embodiment, the dimensions of the extension are selected for a press fit association with the bearing cone 170. The thrust plate 156 may be constructed of any suitable material, for example, bronze. However, in one embodiment, the thrust plate is constructed of a material having a hardness that is less than that of the axle so that wear occurs to the thrust plate 156 over the axle shaft 34. For example, the thrust plate 156 may be cast bronze, while the axle shaft 34 may be a steel component.

Referring again to FIGS. 4-6, to provide lubrication to the bearing 154, the bearing housing 152 may be provided with one or more lubrication channels 242 configured to provide a flow of lubricating fluid from an exterior, for example, axle end cavity 97, to the interior bearing cavity 198 of bearing housing 152. For example, lubrication channels 242 may be in spaced orientation, extending radially from axis 61 between an exterior of the housing, axle end cavity 97, and interior cavity 246 in communication with the cup end of the bearing 154 and biasing members 160.

In one embodiment, not shown, the lubrication channels 242 may lead directly to the interior cavity 246. However, as shown, the bearing housing 152 may be provided with a lubrication recess 248 that is disposed central to the interior end wall 202 along axis 61, the recess 248 may include a fluid deflector 250, such as a cone-shaped deflector that extends outwardly along the axis 61 within the lubrication recess 248. As fluid enters the outer channels 242 from the exterior cavity 97, it enters the lubrication recess 248 and is deflected inwardly toward the bearing 154. The outer portion of the channels 242 adjacent the outer surface of the housing may include a funnel-shaped opening 252 to facilitate capture and entry of lubricating fluid.

The interior of the outer cover plate 128 includes an annular ring 254 that protrudes from an inwardly protruding cone section 256. The ring 254 forms a seal against an end surface 266 of second sun gear 86, thereby enclosing axle end cavity 97 (FIG. 3). To allow lubricating fluid to enter the axle end cavity 97, a series of circumferentially spaced, radially oriented recesses 258 are provided in the ring 254. Thus, lubricating fluid can pass from final drive cavity 126 through the recesses 258 of the outer cover plate 128 churned by the rotating planetary gears 80, 86 to the axle end cavity 97 as the outer cover plate 128 rotates. The lubricating channels 242 may be positioned in planar relationship to the recesses 258 of the outer cover plate 128 to facilitate capture of lubricant entering the axle end cavity 97.

The spherical thrust bearing 154 acts as a pump for lubricating fluid entering inner cavity 246. As the bearing rotates, the tapered rollers create a flow of fluid from the cup end of the bearing 154 through the cage 172 and between the cup and cone raceways 188,194 into outer cavity 244. Fluid flows from the outer cavity 244 through evacuation channels 240 that are provided between the outer cavity 244 and the axle end cavity 97. A number of evacuation channels 240 may be provided in spaced relationship about the circumference of the bearing housing 152, and may be aligned with the lubrication channels 242. The evacuation channels 240 provide a primary fluid path, alleviating pressure build up that could occur in the absence of such channels 240.

One of the many benefits of the disclosed designs is to provide a bearing assembly that is conveniently assembled and maintained. Referring again to FIG. 5, once the internal components of the final drive 38, including, among others, the planetary gears 80, 88, carriers 84,90, pins 96,102 and bearings 98,104 are assembled, outer cover plate 128 may be fastened to the end wall 100 of the final drive housing 40 via circumferentially positioned fasteners, bolts 140. Inner cover plate 130 may be assembled by positioning biasing members 160 within cavities 204 of interior end wall 202, and then sliding the pre-assembled bearing 154 and thrust plate 156 into position against the biasing members 160, the thrust plate extension 184 being press-fit within the bore 182 of the cone 170. Thrust plate 156/bearing 154 may then be forced inward against the bias of springs 160 and retainer 158 positioned within retainer groove 208, the springs 160 maintaining a pre-load on the bearing 154 and forcing the retainer portion 220 of the thrust plate 156 against portions of retainer 158 extending beyond groove 208. Sealing member 150 may then be inserted within groove 151 to complete assembly of the inner cover plate 130. Inner cover plate 130 may then be positioned within axial opening 162 and rotated into position employing threaded members (not shown) inserted within positioning bores 168. Fasteners 140 may then be employed to secure the inner cover plate 130 against inner surface 144 of the outer cover plate 128. The end surface 230 of axle shaft 34 may be pressed against thrust plate axle engaging surface 218, forcing the thrust plate 156 and bearing 154 inward against biasing members 160, displacing the thrust plate 156 off the retainer 158.

During operation, axle shaft 34, operatively connected to the power source and through the differential (not shown), may be driven at a first rate of rotation, for example, up to 1500 rpm. Rotation is transferred through the final drive reduction such that the end wall 100 of final drive housing 40, wheel assembly 42, and connected outer 128 and inner cover plates 130 are driven at a second rotational velocity, for example, at about 92 rpm at a potential maximum velocity. The ratio of rotational velocity of the axle shaft 34 to the wheel assembly 42 may be, for example, about 17 to 1. The thrust plate 156 is frictionally engaged with, and rotates together with the end surface of axle shaft 230, together with the attached bearing cone 170, while the bearing cup 176 is rotationally engaged with the biasing members 160 and rotating cover plates 128, 130. Thus, the axle end bearing assembly 132 provides for axial retention of the axle shaft 34, while allowing relative rotation of the axle shaft 34 and inner cover plate 130, reducing component wear.

In an alternative design, the axle shaft 34 could be fixedly connected to a bearing component and cover plate assembly 127. However, one beneficial aspect of the present detached design is that it allows for greater manufacturing tolerances and misalignment with respect to the axle shaft 34 and the axle end bearing assembly 132 that may occur when you have numerous components to be assembled.

During operation, wear may occur to the thrust plate 156, particularly to axle engaging surface 218, and the thrust plate 156 and bearing 154 may require periodic replacement. The disclosed design provides a convenient means for replacement without having to drain lubricating fluid from the final drive cavity 126 when machine 10 is positioned on a level surface. Drain port 264 may be rotated to a lower position to drain lubricating fluid to a sufficient level for removal of the inner cover plate 130 in some applications, either due to overall design or an uneven surface. The inner cover plate 130 may then be removed via fasteners 140 and disassembled. In another embodiment, provided is a rebuild kit that may include a replacement thrust plate 156, bearing 154, retainer 158 and sealing member 150. Such a kit could also include the biasing members 160.

INDUSTRIAL APPLICABILITY

The present disclosure provides a cover plate and bearing assembly for use in connection with mobile machinery, particularly those that include a power train including a final drive disposed between an axle shaft and the driven traction devices of the machine. More particularly, the disclosed design provides a cover plate assembly 127 having an outer cover plate 128 and an inner cover plate 130 mounted to the exterior of a final drive housing 40 (FIG. 2). The inner cover plate 130 includes a bearing 154 and thrust plate 156 positioned within a bearing housing 152, the thrust plate 156 and bearing 154 axially aligned to engage an end surface 230 of a rotating axle shaft 34 to axially retain the shaft and allow rotation of the axle shaft 34 relative to the cover plate 130 (FIG. 4-5). This results in less stresses placed upon the axle shaft 34 and less wear to internal components caused by engagement of the axle shaft 34 and cover plate 130 in conventional designs. In addition, the inner cover plate 128 may be removed for maintenance or replacement of the bearing assembly 132 and axle shaft 34, without having to remove the outer cover plate 128 and draining all of the lubricating fluid from the final drive housing 40. The overall result is decreased machine maintenance costs, increased productivity, and improved system and environmental cleanliness.

The disclosed design also provides a system for lubricating the bearing 154 and associated components. The bearing housing 152 includes one or more lubrication channels 242 that are in fluid communication with a lubrication recess 248 having a fluid deflector 250 to deliver lubricating fluid to the cup 176 end of the bearing during rotation of the inner cover plate 130, fluid moved via pumping action of the bearing 154 to an outer cavity 244 which may be provided with one or more evacuation channels 240. This provides improved lubrication for the axle end bearing assembly and axle shaft 34, increasing component life.

It should be understood that the above description is intended for illustrative purposes only. While aspects of the present disclosure have been particularly shown and described with reference to the embodiments above, it will be understood by those skilled in the art that various additional embodiments may be contemplated by modification of the disclosed components and methods without departing from the spirit and scope of what is disclosed. Such embodiments should be understood to fall within the scope of the present invention as determined based upon the claims below and any equivalents thereof.

The invention claimed is:

1. A drive assembly for a mobile machine, comprising:
an axle shaft having an outer end and a longitudinal central axis;
a final drive having a plurality of gears operatively connected to the axle shaft and contained within a final drive housing, a cover plate assembly connected to the final drive housing, the cover plate assembly including:
a bearing housing having a first end, wherein the first end is closed, a second end, and
a bearing cavity that is axially aligned with respect to the longitudinal central axis, the bearing cavity defined by an interior housing surface extending between an opening at the second end of the bearing housing and an interior end wall;
a thrust bearing axially disposed within the bearing cavity, the thrust bearing including a cup with a cup raceway, a cone having a cone raceway positioned opposing the cup raceway, and a plurality of rollers positioned between the cup and cone raceways;
a thrust plate having an axle engaging surface disposed perpendicular to the longitudinal central axis, the thrust plate being coupled for rotation to the cone, wherein the outer end of the axle shaft rotationally engages the axle engaging surface.

2. The drive assembly of claim 1, wherein the cover plate assembly includes an outer cover plate and an inner cover plate fastened to the outer cover plate, the outer cover plate including an axial opening, the bearing housing extending from a first end of the inner cover plate and disposed within the axial opening.

3. The drive assembly of claim 2, wherein the first end of the inner cover plate includes a radially extending retaining portion, the inner cover plate being fastened to the outer cover plate at the retaining portion.

4. The drive assembly of claim 3, wherein the retaining portion is a radially extending circumferential flange.

5. The drive assembly of claim 1, wherein the thrust plate includes an extension that is axially aligned with the longitudinal central axis and disposed opposite the axle engaging surface, the cone including an axial bore that receives and frictionally engages the thrust plate extension.

6. The drive assembly of claim 1, wherein the interior housing surface includes an annular retaining groove disposed proximal the opening, a retainer disposed within the retaining groove and configured to retain the thrust plate and associated bearing within the bearing cavity.

7. The drive assembly of claim 6, wherein the bearing housing includes a biasing member positioned between the interior end wall and the cup, the biasing member biasing the thrust plate toward the retainer.

8. The drive assembly of claim 1, wherein the cover plate housing includes a plurality of lubrication channels extending from an outer surface of the bearing housing to the bearing cavity.

9. The drive assembly of claim 8, the interior end wall of the bearing cavity including an annular lubrication recess with an axially aligned deflector, the lubrication channels extending to the lubrication recess.

10. A cover plate for a drive assembly, comprising:
a bearing housing having a bearing cavity with a longitudinal central axis, the bearing cavity defined by an interior housing surface extending between an open end of the bearing housing and an interior end wall defined at a closed end of the bearing housing;
a thrust bearing axially disposed within the bearing cavity, the thrust bearing including a cup with a cup raceway, a cone having a cone raceway positioned opposing the cup raceway, and a plurality of rollers positioned between the cup and cone raceways;
a thrust plate having an axle engaging surface disposed perpendicular to the central axis, the thrust plate being coupled for rotation to the cone; and
a plurality of lubrication channels formed in the bearing housing and radially extending between an outer surface of the bearing housing and the bearing cavity, wherein the lubrication channels extend to a first portion of the bearing cavity adjacent the cup, the bearing housing further including a plurality of evacuation channels extending between the outer surface of the bearing housing and a second portion of the bearing cavity between the open end of the bearing housing and the cone.

11. The cover plate of claim 10, further comprising a retaining portion extending radially from a first end of the cover plate, the bearing cavity extending axially from the first end of the cover plate.

12. The cover plate of claim 11, wherein the retaining portion is a circumferential flange.

13. The cover plate of claim 10, wherein the thrust plate includes an extension that is axially aligned with the longitudinal central axis, the cone including an axial bore defined by a bore inner surface that receives and frictionally engages the thrust plate extension.

14. The cover plate of claim 10, wherein the interior housing surface includes an annular retaining groove disposed proximal the open end, a retainer disposed within the retaining groove and configured to retain the thrust plate and associated bearing within the bearing cavity, a biasing member positioned between the interior end wall and the cup, the biasing member biasing the thrust plate towards the retainer.

15. The drive assembly of claim 10, the interior end wall of the bearing cavity including a lubrication recess with an axially aligned deflector, the lubrication channels extending to the lubrication recess.

16. A cover plate for a final drive, comprising:
a first end and a longitudinal central axis, the first end being closed and including a cover portion having a circumferential retaining flange disposed transverse to the axis;
a bearing housing having a bearing cavity that is axially aligned with the longitudinal central axis, the bearing cavity defined by an interior housing surface extending between an open end of the bearing housing and an interior end wall;
a thrust bearing axially disposed within the bearing cavity, the thrust bearing including a cup with an inwardly facing cup raceway, a cone having an outwardly facing cone raceway positioned opposing the cup raceway, and a plurality of rollers positioned between the cup and cone raceways;
a thrust plate having an axle engaging surface disposed perpendicular to the central axis, the thrust plate having a cylindrical extension opposite the axle engaging surface, the cylindrical extension disposed within a bore of the cone for rotational coupling therewith; and
a plurality of lubrication channels formed in the bearing housing and radially extending between an outer surface of the bearing housing and the bearing cavity, wherein the lubrication channels extend to a first portion of the bearing cavity adjacent the cup, the bearing housing further including a plurality of evacuation channels extending between the outer surface of the bearing housing and a second portion of the bearing cavity between the open end of the bearing housing and the cone.

17. The cover plate of claim 16, wherein the interior end wall of the bearing cavity includes a lubrication recess with an axially aligned deflector, the lubrication channels extending to the lubrication recess.

* * * * *